US007774196B2

(12) United States Patent
Cote et al.

(10) Patent No.: US 7,774,196 B2
(45) Date of Patent: Aug. 10, 2010

(54) SYSTEM AND METHOD FOR MODIFYING A LANGUAGE MODEL AND POST-PROCESSOR INFORMATION (75) Inventors: William F. Cote, Carlisle, MA (US); Jeffrey Chadbourne, Orange, CT (US)

(73) Assignee: Dictaphone Corporation, Burlington, MA (US)

(*) Notice: Subject to any disclaimer, the term of this patent is extended or adjusted under 35 U.S.C. 154(b) by 1636 days.

(21) Appl. No.: 10/953,471

(22) Filed: Sep. 29, 2004

(65) Prior Publication Data
US 2005/0165598 A1 Jul. 28, 2005

Related U.S. Application Data (60) Provisional application No. 60/507,134, filed on Oct. 1, 2003.

(51) Int. Cl.
G06F 17/27 (2006.01)
G06F 17/21 (2006.01)
G10L 15/18 (2006.01)
G10L 11/00 (2006.01)

(52) U.S. Cl. .................. 704/9; 704/10; 704/257; 704/270

(58) Field of Classification Search .................. None
See application file for complete search history.

(56) References Cited

U.S. PATENT DOCUMENTS

| 4,477,698 | A | 10/1984 | Szlam et al. |
| 4,965,763 | A | 10/1990 | Zamora |
| 5,253,164 | A | 10/1993 | Holloway et al. |
| 5,325,293 | A | 6/1994 | Dorne |
| 5,327,341 | A | 7/1994 | Whalen et al. |
| 5,392,209 | A | 2/1995 | Eason et al. |
| 5,544,360 | A | 8/1996 | Lewak et al. ............. 707/1 |
| 5,664,109 | A | 9/1997 | Johnson et al. ............. 705/2 |
| 5,799,268 | A | 8/1998 | Boguraev ............. 704/9 |
| 5,809,476 | A | 9/1998 | Ryan |
| 5,832,450 | A | 11/1998 | Myers et al. ............. 705/3 |
| 5,845,047 | A * | 12/1998 | Fukada et al. ............. 704/268 |
| 5,905,773 | A * | 5/1999 | Wong ............. 379/88.03 |
| 5,970,463 | A | 10/1999 | Cave et al. |
| 6,014,663 | A | 1/2000 | Rivette et al. ............. 707/4 |
| 6,021,202 | A | 2/2000 | Anderson et al. |
| 6,052,693 | A | 4/2000 | Smith et al. ............. 707/104.1 |
| 6,055,494 | A | 4/2000 | Friedman ............. 704/9 |
| 6,088,437 | A | 7/2000 | Amick |
| 6,182,029 | B1 | 1/2001 | Friedman ............. 704/9 |

(Continued)

OTHER PUBLICATIONS

"Hardware Reference Manual," Release 3 for DOS, revised Jan. 1994, PIKA Technologies, Inc., Ontario, Canada, available at http://www.pikatechnologies.com/downloads/legacy/AVA%20B-Series%20Hardware%20Manual.pdf (last accessed Jul. 25, 2005).

(Continued)

*Primary Examiner*—Brian L Albertalli
(74) *Attorney, Agent, or Firm*—Wolf, Greenfield & Sacks, P.C.

(57) ABSTRACT

A system and method for automatically modifying a language model and post-processor information is provided. The system includes the steps of language model identification, site-specific model creation, and language model adaptation.

17 Claims, 5 Drawing Sheets

U.S. PATENT DOCUMENTS

| | | | |
|---|---|---|---|
| 6,188,976 B1 * | 2/2001 | Ramaswamy et al. | 704/9 |
| 6,192,112 B1 | 2/2001 | Rapaport et al. | |
| 6,292,771 B1 | 9/2001 | Haug et al. | |
| 6,347,329 B1 | 2/2002 | Evans | |
| 6,405,165 B1 | 6/2002 | Blum et al. | |
| 6,434,547 B1 | 8/2002 | Mishelevich et al. | |
| 6,438,533 B1 | 8/2002 | Spackman et al. | |
| 6,484,136 B1 * | 11/2002 | Kanevsky et al. | 704/9 |
| 6,553,385 B2 | 4/2003 | Johnson et al. | 707/104.1 |
| 6,915,254 B1 | 7/2005 | Heinze et al. | 704/9 |
| 6,947,936 B1 | 9/2005 | Suermondt et al. | 707/7 |
| 7,043,422 B2 * | 5/2006 | Gao et al. | 704/9 |
| 7,120,582 B1 * | 10/2006 | Young et al. | 704/255 |
| 7,124,144 B2 | 10/2006 | Christianson et al. | 707/102 |
| 2002/0007285 A1 | 1/2002 | Rappaport | 705/2 |
| 2002/0095313 A1 | 7/2002 | Haq | 705/2 |
| 2002/0143824 A1 | 10/2002 | Lee et al. | 707/523 |
| 2002/0169764 A1 | 11/2002 | Kincaid et al. | 707/3 |
| 2003/0046264 A1 | 3/2003 | Kauffman | 707/1 |
| 2003/0061201 A1 | 3/2003 | Grefenstette et al. | 707/3 |
| 2003/0083883 A1 * | 5/2003 | Cyr et al. | 704/270.1 |
| 2003/0115080 A1 | 6/2003 | Kasravi et al. | 705/1 |
| 2003/0208382 A1 | 11/2003 | Westfall | 705/3 |
| 2003/0233345 A1 | 12/2003 | Perisic et al. | 707/3 |
| 2004/0098263 A1 * | 5/2004 | Hwang et al. | 704/266 |
| 2004/0103075 A1 | 5/2004 | Kim et al. | 707/1 |
| 2004/0139400 A1 | 7/2004 | Allam et al. | 715/526 |
| 2004/0186746 A1 | 9/2004 | Angst et al. | 705/3 |
| 2004/0220895 A1 | 11/2004 | Carus et al. | |
| 2004/0243545 A1 | 12/2004 | Boone et al. | |
| 2004/0243551 A1 | 12/2004 | Boone et al. | |
| 2004/0243552 A1 | 12/2004 | Titemore et al. | |
| 2004/0243614 A1 | 12/2004 | Boone et al. | |
| 2005/0108010 A1 | 5/2005 | Frankel et al. | |
| 2005/0114122 A1 | 5/2005 | Uhrbach et al. | |
| 2005/0120020 A1 | 6/2005 | Carus et al. | |
| 2005/0120300 A1 | 6/2005 | Schwager et al. | |
| 2005/0144184 A1 | 6/2005 | Carus et al. | |

OTHER PUBLICATIONS

"Customizing D/41 Call Analysis," date unknown, Intel Corp., Santa Clara, California, available at http://resource.intel.com/telecom/support/appnotes/custd41d.htm (last accessed Jul. 25, 2005).

F. Song et al., A Graphical Interface to a Semantic Medical Information System, *Journal of Foundations of Computing and Decision Sciences*, 22(2), 1997.

F. Song et al., A Cognitive Model for the Implementation of Medical Problem Lists, *Proceedings of the First Congress on Computational Medicine, Public Health and Biotechnology*, Austin, Texas, 1994.

F. Song et al., A Graphical Interface to a Semantic Medical Information System, *Karp-95 Proceedings of the Second International Symposium on Knowledge Acquisition*, Representation and Processing, pp. 107-109, 1995.

*Epic Web Training Manual*, pp. 1-33, 2002.

B. Hieb, Research Note, NLP Basics for Healthcare, Aug. 16, 2002.

C. Shalizi et al., Pattern Discovery in Time Series, Part I: Theory, Algorithm, Analysis, and Convergence, *Journal of Machine Leaning Research* ? (2002) ?-? Submitted Oct. 28, 2002; Published ?/2002.

C. Nevill-Manning et al., The Development of Holte's 1R Classifier, Department of Computer Science.

D. Cutting et al., A Practical Part-of-Speech Tagger, Xerox Palo Alto Research Center.

J. Zavrel et al., Recent Advances in Memory-Based Part-of-Speech Tagging, ILK/Computational Linguistics.

E. Brill, Some Advances in Transformation-Based Part of Speech Tagging, Spoken Language Systems Group.

J. Nivre, DAC723: Language Technology Finite State Morphology, Vaxjo University of Mathematics and Systems Engineering, p. 1/11.

M. Creutz, Morphology and Finite-State Transducers, Oct. 31, 2001, Chap 3, Jurafsky & Martin.

http://www.comp.lancs.ac.uk/computing/research/stemming/general/index.htm printed Jul. 19, 2004.

http://www.comp.lancs.ac.uk/computing/research/stemming/general/stemmingerrors.htm printed Jul. 19, 2004.

http://www.comp.lancs.ac.uk/computing/research/stemming/general/performance.htm printed Jul. 19, 2004.

M. Lee et al., Cleansing Data for Mining and Warehousing, Lecture Notes in Computer Science vol. 1677 archive, *Proceedings of the 10th International Conference on Database and Expert Systems Applications*, pp. 751-760, Springer-Verlag, London, 1999.

C. Van Rijsbergen, *Information Retrieval*, 2nd Ed., Ch. 5, Butterworths, London, 1979.

J. Day, Extracting Knowledge from Text Using Learning by Constraint Relaxation (LCR), CSI, www.csi-inc.com/CSI/pdf/jday_icim02.pdf.

W. Gale et al., Discrimination Decisions for 100,000-Dimensional Spaces, *Current Issues in Computational Linguistics*, pp. 429-450, Kluwer Academic Publishers, 1994.

W. Daelemans et al., TiMBL: Tilburg Memory Based Learner, version 5.0, Reference Guide, ILK *Research Group Technical Report Series No. 04-02 (ILK-0402)*, ILK Research Group, Tilburg University, Tilburg, Netherlands, 2004.

Case Study: Massachusetts Medical Society http://www.microsoft.com/resources/casestudies/CaseStudy.asp?CaseStudyID=14931 posted Jan. 13, 2004.

W. Braithwaite, Continuity of Care Record (CCR) http://www.hl7.org/library/himss/20040rlando/ContinuityofCareRecord.pdf.

C. Waegemann, EHR vs. CCR: What is the difference between the electronic health record and the continuity of care record?, Medical Records Institute, 2004.

Press Release: Kryptiq Announces Support of CCR Initiative and Introduces New Solutions that Enable Information Portability, Accessibility and Clinical System Interoperability, http://www.kryptiq.com/News/PressReleases/27.html posted Feb. 17, 2004.

Work Item Summary: WK4363 Standard Specification for the Continuity of Care Record (CCR), http://www.astm.org/cgi-bin/SoftCart.exe/DATABASE.CART/WORKITEMS/WK4363.htm?E+mystore Mar. 3, 2004.

Continuity of Care Record (CCR): The Concept Paper of the CCR, v. 2.1b, http://www.bhtinfo.com/CCR.Concept%20Paper.1.5.doc.

Continuity of Care Record, American Academy of Family Physicians, http://www.aafp.org/x24962.xml?printxml posted Nov. 12, 2003.

Continuity of Care Record (CCR), AAFP Center for Health Information Technology, http://www.centerforhit.org/x201.xml posted Aug. 20, 2004.

Core Measures web page, Joint Commission on Accreditation of Healthcare Organizations, http://www.jcaho.org/pms/core+measures/ printed Mar. 22, 2004.

Specifications Manual for National Implementation of Hospital Core Measures, v. 2.0, Joint Commission on Accreditation of Healthcare Organizations, http://www.jcaho.org/pms/core+measures/information+on+final+specifications.htm.

Code Information and Education web page, American Medical Association, http://www.ama-assn.org/ama/pub/category/3884.html printed Mar. 22, 2004.

Category III CPT Codes, American Medical Association, http://www.ama-assn.org/ama/pub/article/3885-4897.html printed Mar. 22, 2004.

ICD-9-CM Preface (FY04), http://ftp.cdc.gov/pub/Health_Statistics/NCHS/Publications/ICD9-CM/2004/Prefac05.RTF.

*ICD-9-CM Official Guidelines for Coding and Reporting*, effective Oct. 1, 2003.

Q. X. Yang et al., "Faster algorithm of string comparison," *Pattern Analysis and Applications*, vol. 6, No. 1, Apr. 2003: pp. 122-133.

U.S. Appl. No. 10/953,448, filed Sep. 30, 2004, Alwin B. Carus.

U.S. Appl. No. 10/951,291, filed Sep. 27, 2004, Amy J. Uhrbach.

U.S. Appl. No. 10/953,474, filed Sep. 29, 2004, Alan Frankel.

U.S. Appl. No. 11/007,626, filed Dec. 8, 2004, William F. Cote.

U.S. Appl. No. 11/069,203, filed Feb. 28, 2005, William F. Cote.

U.S. Appl. No. 11/068,493, filed Feb. 28, 2005, Alwin B. Carus.

U.S. Appl. No. 10/787,889, filed Feb. 27, 2004, Alwin B. Carus.

U.S. Appl. No. 10,948,625, filed Sep. 23, 2004, Robert Schwager.
U.S. Appl. No. 10/840,428, filed May 7, 2004, Alwin B. Carus.
U.S. Appl. No. 10/447,290, filed May 29, 2003, Keith W. Boone.
U.S. Appl. No. 10/448,320, filed May 30, 2003, Keith W. Boone.
U.S. Appl. No. 10/448,317, filed May 30, 2003, Keith W. Boone.
U.S. Appl. No. 10/448,325, filed May 30, 2003, Robert Titemore.
U.S. Appl. No. 10/413,405, filed Apr. 15, 2003, Alwin B. Carus.

U.S. Appl. No. 10/951,281, filed Sep. 27, 2004, William F. Cote.
U.S. Appl. No. 11/068,493, Carus, et al.
U.S. Appl. No. 11/069,203, Cote, et al.
U.S. Appl. No. 11/007,626, Cote, et al.
U.S. Appl. No. 10/840,428, Carus, et al.
U.S. Appl. No. 10/951,281, Cote, et al.

* cited by examiner

Set of Factory Language Models 100

LM1    Radiology
LM2    Internal Medicine
LM3    Cardiology
  . . . .
LM10   Overall Medicine

SYSTEM AND METHOD FOR MODIFYING A LANGUAGE MODEL AND POST-PROCESSOR INFORMATION

CROSS-REFERENCE TO RELATED APPLICATIONS

This application claims the benefit of priority of U.S. Provisional Patent Application No. 60/507,134, entitled "SYSTEM AND METHOD FOR MODIFYING A LANGUAGE MODEL AND POST-PROCESSOR INFORMATION," filed Oct. 1, 2003, which is hereby incorporated by reference in its entirety.

This application also relates to co-pending U.S. patent application Ser. No. 10/413,405, entitled, "INFORMATION CODING SYSTEM AND METHOD", filed Apr. 15, 2003; co-pending U.S. patent application Ser. No. 10/447,290, entitled, "SYSTEM AND METHOD FOR UTILIZING NATURAL LANGUAGE PATIENT RECORDS", filed on May 29, 2003; co-pending U.S. patent application Ser. No. 10/448,317, entitled, "METHOD, SYSTEM, AND APPARATUS FOR VALIDATION", filed on May 30, 2003; co-pending U.S. patent application Ser. No. 10/448,325, entitled, "METHOD, SYSTEM, AND APPARATUS FOR VIEWING DATA", filed on May 30, 2003; co-pending U.S. patent application Ser. No. 10/448,320, entitled, "METHOD, SYSTEM, AND APPARATUS FOR DATA REUSE", filed on May 30, 2003; co-pending U.S. patent application Ser. No. 10/948,625, entitled "METHOD, SYSTEM, AND APPARATUS FOR ASSEMBLY, TRANSPORT AND DISPLAY OF CLINICAL DATA", filed Sep. 23, 2004; co-pending U.S. Provisional Patent Application Ser. No. 60/507,136, entitled, "SYSTEM AND METHOD FOR DATA DOCUMENT SECTION SEGMENTATIONS", filed on Oct. 1, 2003; co-pending U.S. Provisional Patent Application Ser. No. 60/507,135, entitled, "SYSTEM AND METHOD FOR POST PROCESSING SPEECH RECOGNITION OUTPUT", filed on Oct. 1, 2003; co-pending U.S. patent application Ser. No. 10/951,291, entitled, "SYSTEM AND METHOD FOR CUSTOMIZING SPEECH RECOGNITION INPUT AND OUTPUT", filed Sep. 27, 2004; co-pending U.S. Provisional Patent Application Ser. No. 60/533,217, entitled "SYSTEM AND METHOD FOR ACCENTED MODIFICATION OF A LANGUAGE MODEL" filed on Dec. 31, 2003, co-pending U.S. Provisional Patent Application Ser. No. 60/547,801, entitled, "SYSTEM AND METHOD FOR GENERATING A PHRASE PRONUNCIATION", filed on Feb. 27, 2004, co-pending U.S. patent application Ser. No. 10/787,889 entitled, "METHOD AND APPARATUS FOR PREDICTION USING MINIMAL AFFIX PATTERNS", filed on Feb. 27, 2004; co-pending U.S. Provisional Application Ser. No. 60/547,797, entitled "A SYSTEM AND METHOD FOR NORMALIZATION OF A STRING OF WORDS," filed Feb. 27, 2004; and co-pending U.S. Provisional Application Ser. No. 60/505,428, entitled "CATEGORIZATION OF INFORMATION USING NATURAL LANGUAGE PROCESSING AND PREDEFINED TEMPLATES", filed Mar. 31, 2004, all of which co-pending applications are hereby incorporated by reference in their entirety.

BACKGROUND OF THE INVENTION

The present invention relates generally to a system and method for producing an optimal language model for performing speech recognition.

Today's speech recognition technology enables a computer to transcribe spoken words into computer recognized text equivalents. Speech recognition is the process of converting an acoustic signal, captured by a transducive element, such as a microphone or a telephone, to a set of words. These words can be used for numerous applications including data entry and word processing. The development of speech recognition technology is primarily focused on accurate speech recognition, which is a formidable task due to the wide variety of pronunciations, individual accents, and speech characteristics of individual speakers. Speech recognition is also complicated by the highly technical and scientific vocabulary used in certain applications for speech recognition technology, such as in the medical profession.

The key to speech recognition technology is the language model. A language model describes the type of text the dictator will speak about. For example, speech recognition technology designed for the medical profession will utilize different language models for different specialties in medicine. In this example, a language model is created by collecting text from doctors in each specialty area, such as radiology, oncology, etc. The type of text collected would include language and words associated with that practice, such as diagnoses and prescriptions.

Today's state of the art speech recognition tools utilize a factory (or out-of-the-box) language model and a separate customizable site-specific language model. A recognition server determines if the site language model requires updating by monitoring the dates the factory language model and the customized site-specific language model were created, modified, or copied. The site language model would then be updated via a process to add words. Making updates to the factory language models requires the recognition server to run through and update all of the language models before they are ready to run recognition tasks.

Separate independent processes are used to (1) update the site language model, and (2) perform the batch speech recognition task using the updated site-specific language model. If the recognition server had not updated the site language model, the previous out-of-date site language model would be used in step 2. Once the speech recognition creates a transcribed output report using the language model, the transcribed report is then run through post-processing which applies formatting to the report.

What is needed is speech recognition technology that automatically updates the site language model and ensures that the most up-to-date site language model is used for recognition.

SUMMARY OF THE INVENTION

The present invention includes a system and method for modifying a language model and post-processor information by adding site specific words to a vocabulary and using pre-existing corrected reports along with an optional accented word list to update the task language model.

In a first embodiment, the system may include the steps of language model identification, site-specific model creation, and language model adaptation. In language model identification, the method includes collecting a set of language models, collecting a set of corrected dictated reports, collecting site specific data from a user, matching each dictated report with each language model, determining a perplexity factor for each language model, and determining the language model having the lowest perplexity factor. Each corrected dictated report is matched with each language model and a perplexity factor is determined for each language model. The language model having the lowest perplexity factor is then selected. A site-specific language model is then created by adding the site specific data to the selected language model. In some embodiments, the site specific data includes add word lists and post processing information such as spacing and capitalization. In language model adaptation, a task language model is then created by adapting the site specific language model by updating a set of statistics for the language model, and adding an accent word list to the language model. In some embodiments there is the step of creating a site-specific language model by adding the site specific data to the language model having the lowest perplexity factor and adapting the site specific language model to create a task language model, and outputting the task language model. In some embodiments the adapting step may include updating a set of statistics for the language model and adding an accent word list to the language model to create a task language model. In some embodiments the set of statistics includes bigrams or trigrams. In some embodiments there is a step of adapting the language model with the lowest perplexity factor to create a task language model, and outputting the task language model. The adapting step may include the language model with the lowest perplexity factor including updating a set of statistics for the language model and adding an accent word list to the language model to create the task language model.

In a second embodiment the present invention includes a system and method for modifying a language model and post-processor information, including the steps of collecting the language model, collecting a set of corrected dictated reports, collecting site specific data from a user, determining whether the user has an accent, creating an accent specific list based on the user's accent; and creating a site-specific language model by adding the site specific data to the language model.

In a third embodiment the present invention includes a system and method for modifying a language model and post-processor information, including the steps of collecting the language model, collecting a set of corrected dictated reports, collecting site specific data from a user, determining whether the user has an accent, creating an accent specific list based on the user's accent, and adapting the language model to create a task language model, and outputting the task language model.

In a fourth embodiment the present invention includes an apparatus structured and arranged to modify a language model and post-processor information, including collecting the language model, collecting a set of corrected dictated reports, collecting site specific data from a user, determining whether the user has an accent, creating an accent specific list based on the user's accent, and adapting the language model to create a task language model, and outputting the task language model.

BRIEF DESCRIPTION OF THE DRAWINGS

While the specification concludes with claims particularly pointing out and distinctly claiming the present invention, it is believed the same will be better understood from the following description taken in conjunction with the accompanying drawings, which illustrate, in a non-limiting fashion, the best mode presently contemplated for carrying out the present invention, and in which like reference numerals designate like parts throughout the Figures, wherein:

DETAILED DESCRIPTION OF THE PREFERRED EMBODIMENTS

The present disclosure will now be described more fully with reference the to the Figures in which an embodiment of the present disclosure is shown. The subject matter of this disclosure may, however, be embodied in many different forms and should not be construed as being limited to the embodiments set forth herein.

Figure 1:
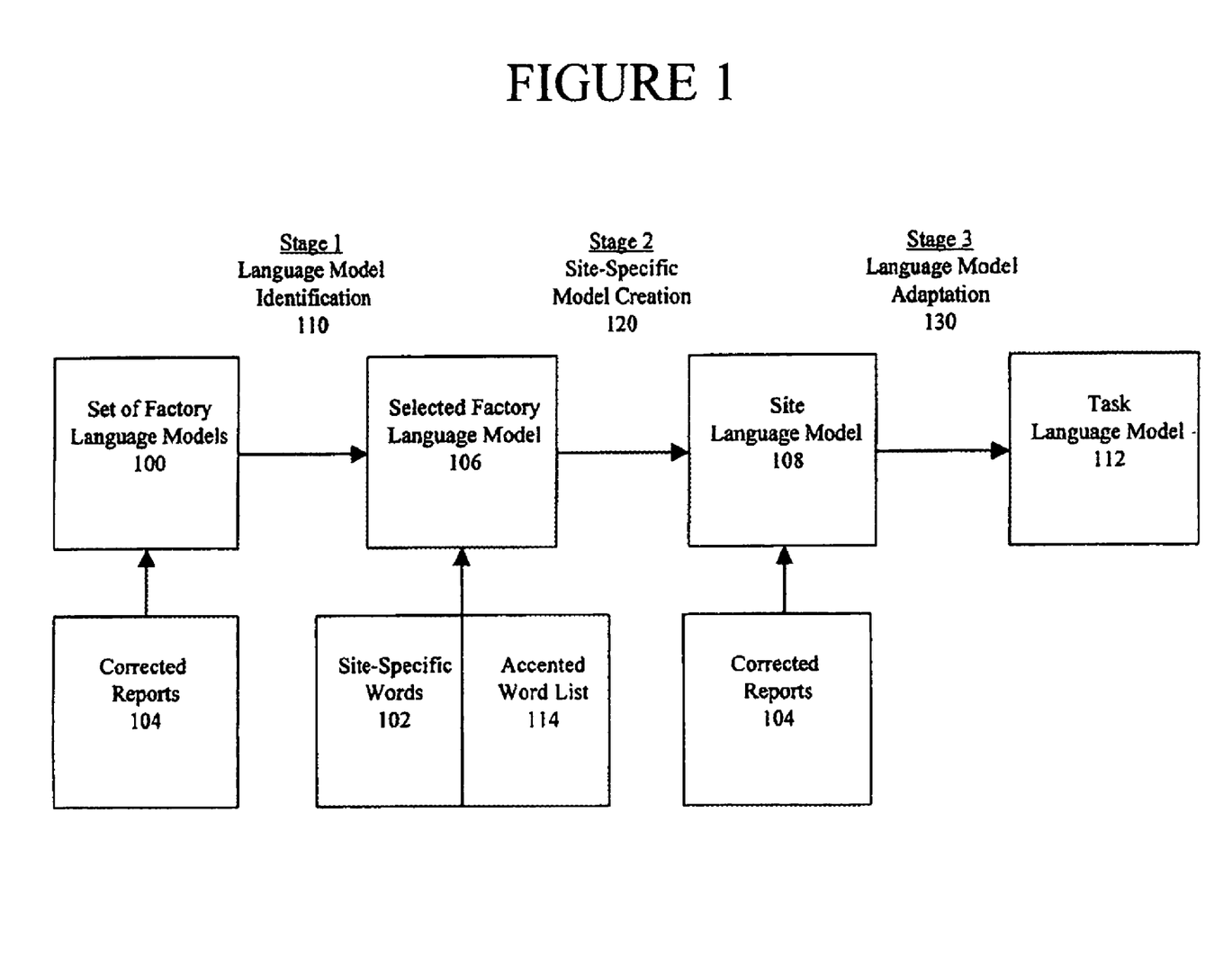
FIG. 1 shows an architecture view of the system and method for modifying a language model in accordance with certain teachings of the present disclosure.

Referring to FIG. 1 shows an architecture view of the system and method for modifying a language model in accordance with certain teachings of the present disclosure. The inputs to the proposed process include a collection of factory language models 100 that are each designed to support a different type of report, a collection of site specific words 102 that tend to be used at a specific location, and a collection of previously corrected reports 104 for the specific user and the particular work type.

Figure 2:
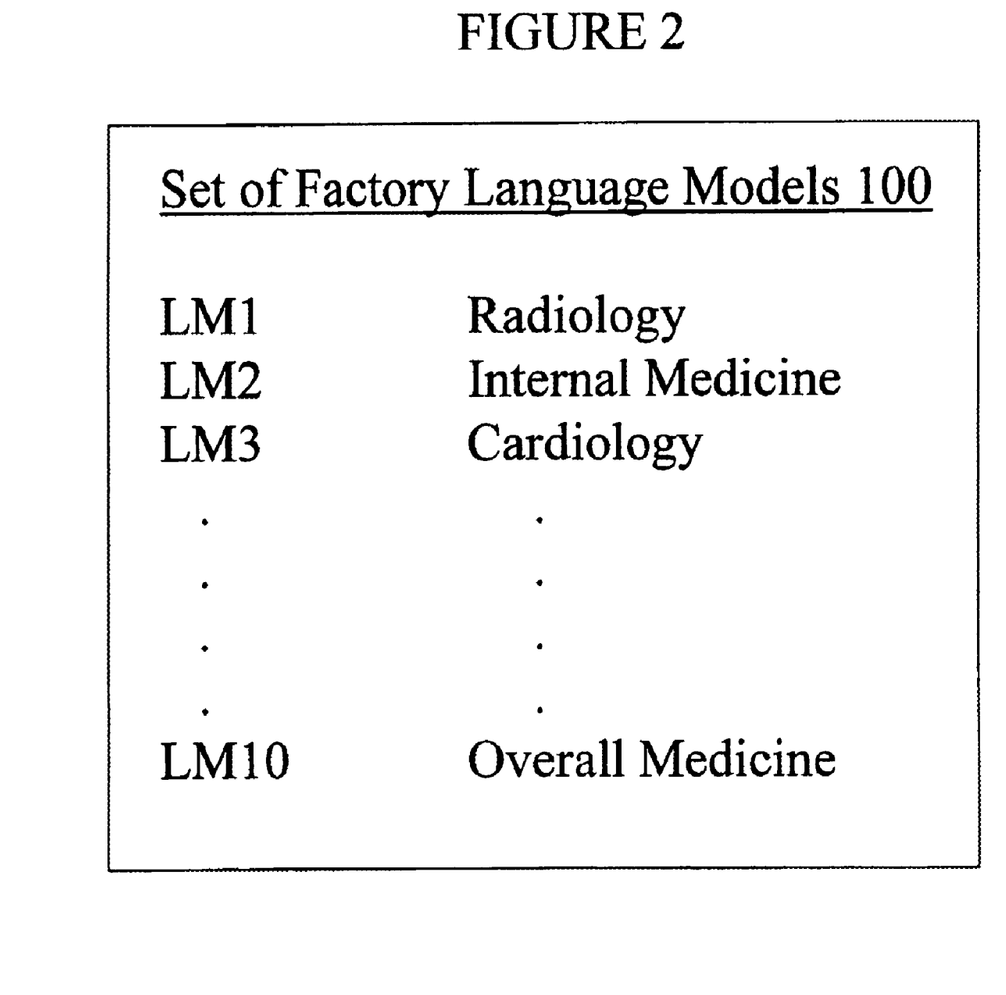
FIG. 2 shows the language model identification 100.

The process to automatically modify a language model runs in three stages. In stage 1 (110), language model identification chooses the best factory language model 106 from the collection of factory language models 100. FIG. 2 illustrates the concept of the language model identification 110 step. Each of the factory language models 100 is associated with a specific task or a specific subject matter. For example, as shown in FIG. 2, a collection of factory language models in the medical profession may be associated with the type of medicine that the user/doctor practices. In this illustrative embodiment, LM1 is a factory language model associated with radiology, LM2 is a factory language model associated with internal medicine, LM3 is a factory language model associated with cardiology, and LM10 is a general factory language model associated with the overall medical profession.

The collection of corrected reports 104 is used to choose the best factory language model 106 and are reports that a user has dictated for the same worktype. For example, in the medical profession, the collection of corrected text reports 104 may include the name of common diagnoses, drugs, and procedures that this doctor dictates about when reporting in this worktype. In one embodiment of this step, each factory language model is matched and compared with corrected text reports 104 in order to determine a perplexity factor for each language model. The language model with the lowest perplexity is selected as the best factory language model 106 for the present application.

In stage 2 (120), the collection of site-specific words 102 are added to the best factory language model 106 in order to create the site language model 108. For example, for speech recognition applications for the medical industry, site-specific words may include doctor names, place names, names of procedures, names of diagnoses, and drug names. If appropriate, an accented word list 114 may also be added at this stage to ensure a better match for users with specific accents.

In stage 3 (130), language model adaptation applies the collection of corrected reports 104 to adapt the site language model 108 to the individual user's speaking style. This is accomplished with bi-grams and tri-grams, which statistically break down the pattern of words used by a specific individual, and acts to actively predict the next most likely word to follow a distinctive word. For example, the next most likely word to follow a doctor's use of the word "dilated" might be "pupil." The output from this stage is a task language model 112. If appropriate, an accented word list 114 may also be added at this stage to ensure a better match for users with specific accents. Furthermore, it is envisioned that postprocessor information may also be implemented to customize the task language model and thus the speech recognition output, enabling site-specific formatting such as capitalization, and heading format.

Figure 3:
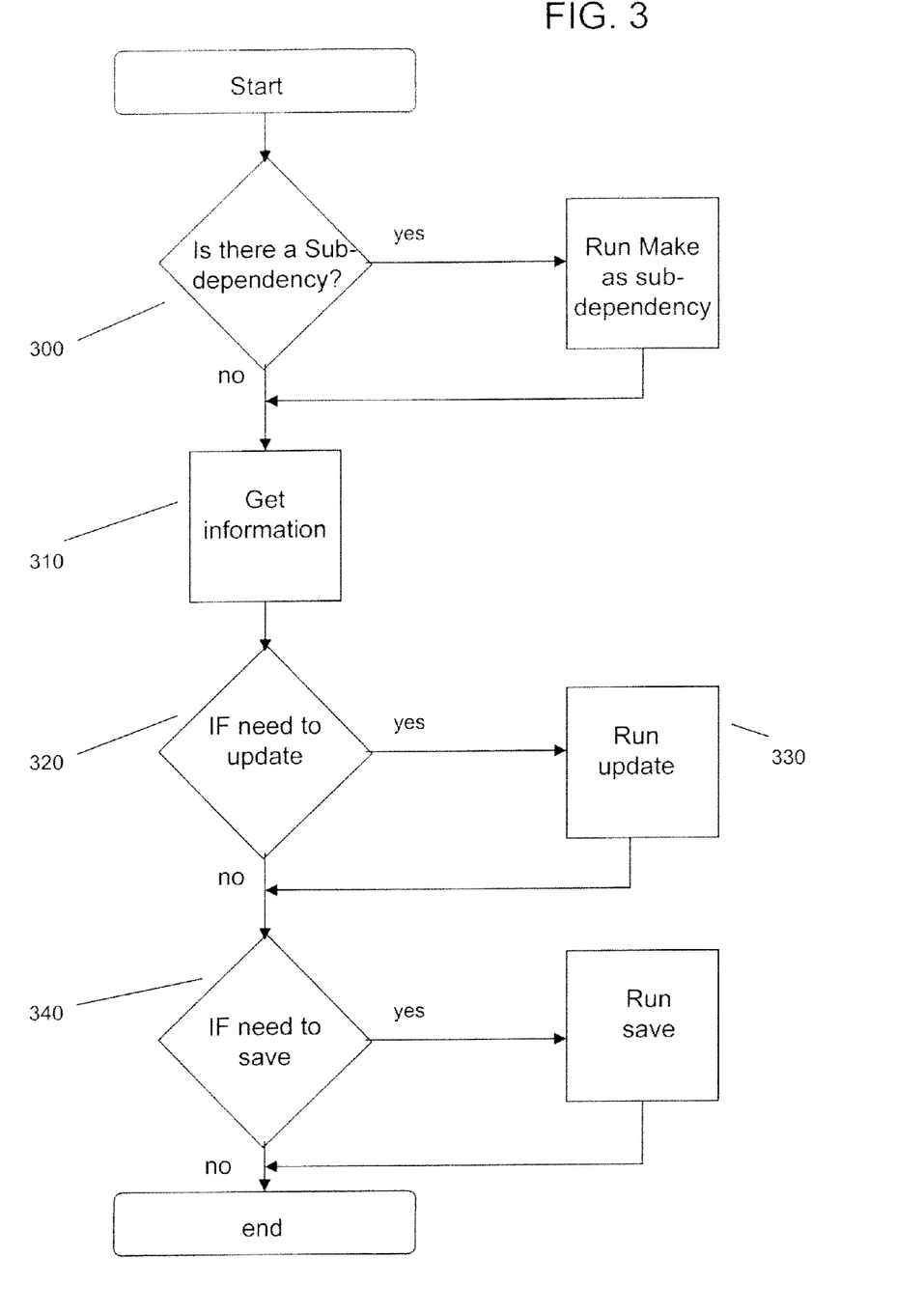
FIG. 3 is a flow diagram showing the steps for modifying each stage in FIG. 1.

The process described herein is implemented automatically using, for example, a computer program in C++ implementing a CDependency object. This CDependency object would be utilized in each of the three stages described with respect to FIG. 1. FIG. 3 illustrates the general algorithm employed by the CDependency object for each stage. First (300), the object determines if any sub-dependencies need to be updated prior to evaluating the inputs to the stage. An example of a sub-dependency would be the language model from a previous stage in the system. For example, referring back to FIG. 1, the task language model 112 depends on the site language model 108 which depends on the selected factory language model 106. Each sub-dependency would be updated in this sequential manner (factory language models, then site language model, then task language model). The CDependency object then would then acquire each of the required inputs (310) and determines whether that stage must be updated to create a new output (320). If that stage is already up-to-date, the pre-existing output of that stage is loaded. If the stage is not up-to-date, that stage is run to create an updated output (330). If any changes were made to that stage, the new output is saved for use in the next stage (340). The same CDependency object can also used to update a postprocessor initialization (INI) file. The main inputs to this stage are the factory-created post-processor INI file as well as site-customized post-processor INI files. These files include, for example, formatting information such as headings, capitalization, spacing, font, etc. This post-processor INI customization is updated in one-step and can be used to postprocess the output of speech recognition, enabling site-specific formatting of the final output report text.

Figure 4:
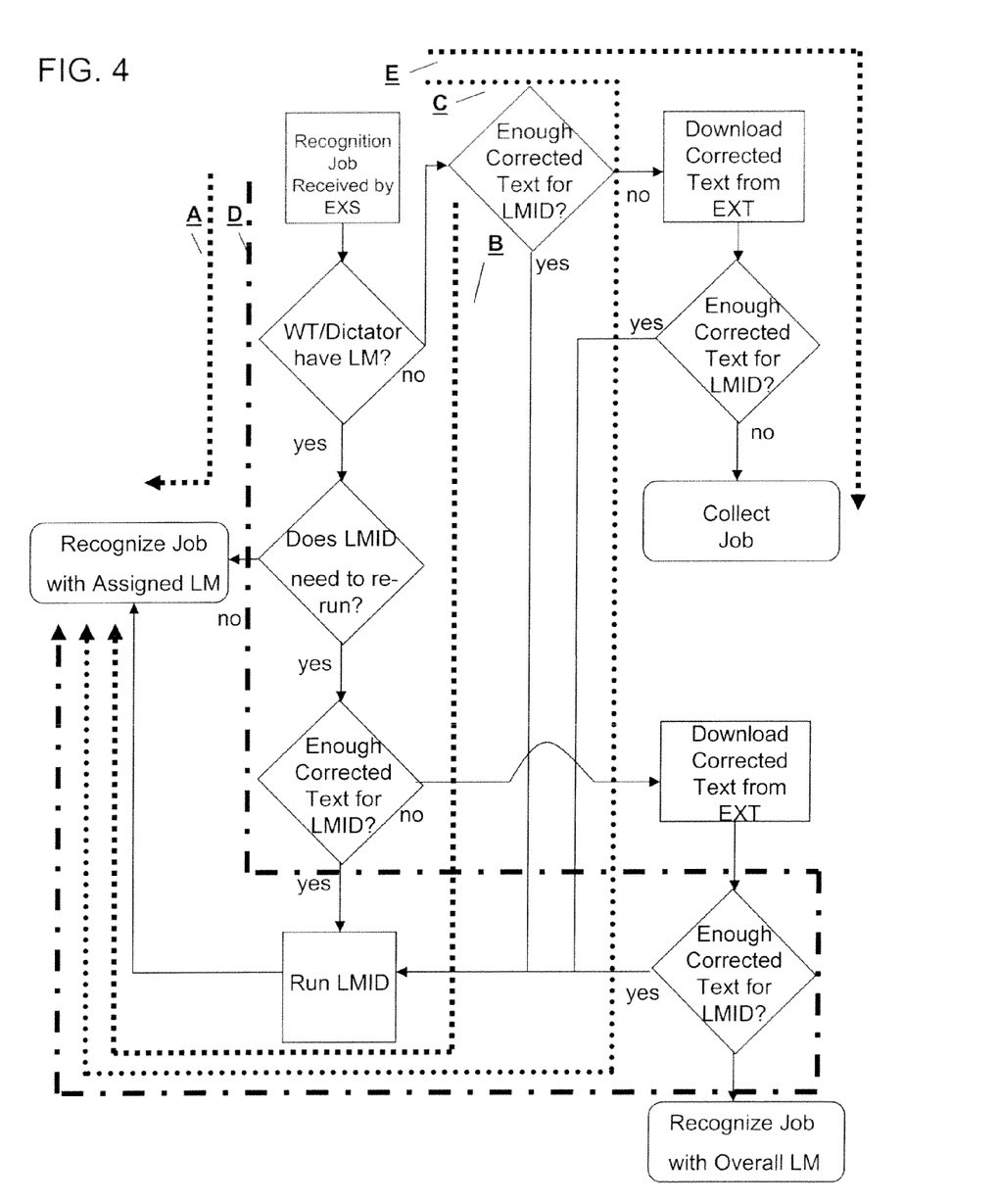
FIG. 4 shows an alternative embodiment of the steps for executing stage 1 language model identification.

FIG. 4 shows an alternative embodiment of the steps for automatically executing stage 1 language model identification (LMID) in relation to a speech recognition server. LMID runs automatically whenever the speech recognition server detects new language models have been added to the system. According to the algorithm shown in FIG. 4, the language model identification runs if the dictator does not have a language model assigned for this worktype (402) and has enough corrected text (e.g., >2100 words) to make a selection of the best language model (404), or if the language model identification needs to be rerun due to new or updated language models (400). If not enough corrected text is present locally, an attempt will be made to retrieve corrected text from the speech recognition server. The corrected text is then automatically downloaded from the speech recognition server and will be used by the local dictator program in language model identification (406). As is demonstrated by FIG. 4, LMID, which is a scheduled event in the prior art, may now be launched automatically on an as needed basis depending on the availability of updated information. The same inventive concept can be utilized with respect to stage 2 and stage 3 of the process described in FIG. 1, constantly updating the site language model and task language model, respectively, as more updated site-specific word lists, accented word lists, and corrected reports are added to the speech recognition server.

Figure 5:
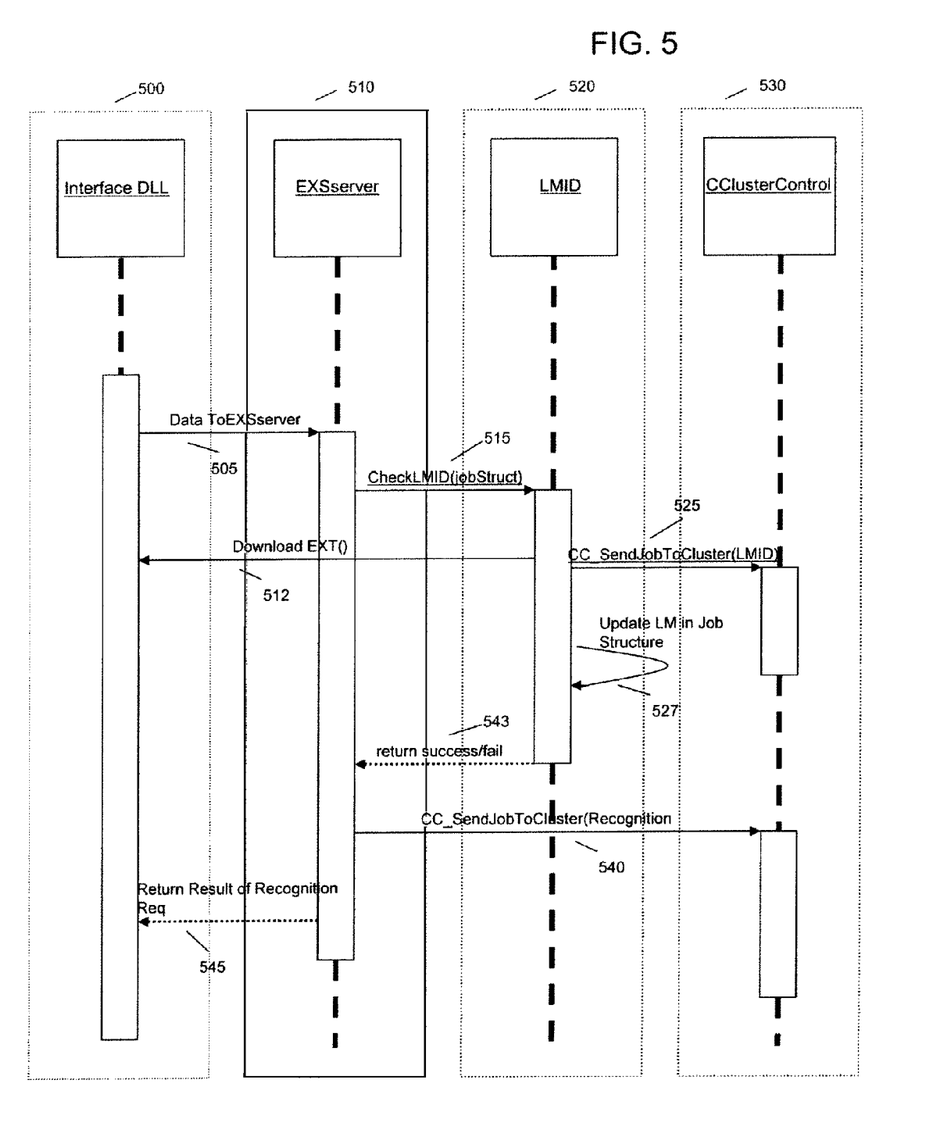
FIG. 5 shows the flow of work through a speech recognition server in accordance with certain teachings of the present disclosure.

The flow chart in FIG. 4 describes several scenarios that may occur. First, the job may be submitted without need to run the language model identification (Path A). Second, the language model identification may need to be run, and enough corrected text is present such that the speech recognition server does not download any additional text (Path B). Third, the language model identification may need to be run, and not enough corrected text is present on the management server such that the speech recognition server must download additional corrected text (Paths C and D). Fourth, the language model identification may need to run, yet not enough corrected text is present even after the download from the speech recognition server (Path E). In this case, one option is that the language model defaults to a certain model, such as a general or overall language model. Either speech recognition and correction, or manual transcription can be used to generate more reports, in order to collect more text till there is enough to support LMID FIG. 5 shows one embodiment for the flow of work for stage 1 language model identification (LMID) through a speech recognition server in accordance with certain teachings of the present disclosure. Interface DLL 500 represents an interface to the outside systems or in this case it would be the EX Speech voice system. Text documents flow to the EX Server 510 via line 505. In the preferred embodiment it is desirable to obtain information about a specified recognition request. A request can be made of the LMID 520 object and a check 515 can be instructed to represent the request. The LMID 520 must determine, based upon a recognition request configuration, whether the specific request requires a LMID. In the present example, the system assumes that it will require LMID. The LMID therefore requires existing data from the Text System which is sought via line 512 through the interface DLL 500.

Once data returns from the text system a signal is sent to the recognition wrappers or agents 530 which is indicated by line 525. The wrapper 530 may be a self-contained component that contains the speech server, or it may sit on a machine external to a speech server. Wrapper 530 is the entity that does the speech recognition tasks. Line 525 represents the LMID 520 object submitting a request to the recognition wrapper 530 to do the LMID task.

Returning to FIG. 5, the recognition wrapper 530 on the system to returns to LMID. Once that returns, the LMID object will use the new value of the LMID chosen by the wrapper 530. The system will update the record (line 527) in memory in the job structure and then return that back to the EX server 510 via line 543. Once the EX server 510 now has received the updated job, and the LM has been updated, the job may be forwarded to the recognition wrapper 530 via line 540. Once that response is returned the system evaluates whether or not it is successful or not (line 545). Assuming success, the database structure that assigns the appropriate LM to this user for this worktype can be updated.

It will be apparent to one of skill in the art that described herein is a novel system and method for automatically modifying a language model. While the invention has been described with reference to specific preferred embodiments, it is not limited to these embodiments. The invention may be modified or varied in many ways and such modifications and variations as would be obvious to one of skill in the art are within the scope and spirit of the invention and are included within the scope of the following claims.

The invention claimed is:

1. A method in a computer system for selecting a language model, the method comprising:
    operating the computer system to perform steps of:
        collecting a plurality of language models;
        collecting a set of corrected dictated reports;

comparing the corrected dictated reports with the plurality of language models;
determining a perplexity factor for each of the plurality of language models based on the comparison with the corrected dictated reports; and
selecting the one of the plurality of language models having the lowest perplexity factor.

2. The method according to claim 1, further comprising:
collecting site specific data from a user of said computer system; and
creating a site-specific language model by adding the site specific data to the selected one of the plurality of language models having the lowest perplexity factor.

3. The method according to claim 2, wherein the site specific data comprises add word lists and post processing information.

4. The method according to claim 3, further comprising adapting the site-specific language model to create a task language model, and outputting the task language model.

5. The method according to claim 4, wherein adapting the site-specific language model comprises:
updating a set of statistics for the site-specific language model; and
adding an accent word list to the site-specific language model to create the task language model.

6. The method according to claim 5, wherein the set of statistics includes bigrams or trigrams.

7. The method according to claim 1, further comprising adapting the selected one of the plurality of language models with the lowest perplexity factor to create a task language model, and outputting the task language model.

8. The method according to claim 7, wherein adapting the selected one of the plurality of language models with the lowest perplexity factor comprises:
updating a set of statistics for the selected one of the plurality of language models; and
adding an accent word list to the selected one of the plurality of language models to create the task language model.

9. The method according to claim 8, wherein the set of statistics includes bigrams or trigrams.

10. A method in a computer system comprising:
operating the computer system to perform steps of:
selecting a language model from among a plurality of factory language models;
collecting site specific data from a user;
transforming the selected language model into a site-specific language model by adding the site-specific data to the selected language mode;
determining whether the user has an accent;
creating an accent specific word list based on the user's accent; and
adding the accent specific word list to the site-specific language model.

11. The method according to claim 10, further comprising;
adapting the site-specific language model to create a task language model; and
outputting the task language model.

12. The method according to claim 11, wherein adapting the site-specific language model further comprises:
updating a set of statistics for the site-specific language model.

13. The method according to claim 12, wherein the set of statistics includes bigrams and/or trigrams.

14. A computer system comprising:
at least one computer programmed to perform steps of:
selecting a language model from among a plurality of factory language models;
collecting site specific data from a user;
transforming the selected language model into a site-specific language model by adding the site specific data to the selected language mode;
determining whether the user has an accent;
creating an accent specific word list based on the user's accent; and
adding the accent specific word list to the site-specific language model.

15. The computer system according to claim 14, wherein the at least one computer is further programmed to:
adapt the site specific language model to create a task language model; and
output the task language model.

16. The computer system according to claim 15, wherein adapting the site-specific language model further comprises:
updating a set of statistics for the selected language model.

17. The computer system according to claim 16, wherein the set of statistics includes bigrams or trigrams.

* * * * *

UNITED STATES PATENT AND TRADEMARK OFFICE
CERTIFICATE OF CORRECTION

| | | |
|---|---|---|
| PATENT NO. | : 7,774,196 B2 | Page 1 of 1 |
| APPLICATION NO. | : 10/953471 | |
| DATED | : August 10, 2010 | |
| INVENTOR(S) | : William F. Cote et al. | |

It is certified that error appears in the above-identified patent and that said Letters Patent is hereby corrected as shown below:

At column 8, claim 10, line 4, please change "mode" to -- model --;

At column 8, claim 11, line 10, please change "comprising;" to -- comprising: --;

At column 8, claim 14, line 27, please change "mode" to -- model --.

Signed and Sealed this

Twenty-eighth Day of September, 2010

David J. Kappos
*Director of the United States Patent and Trademark Office*